(12) United States Patent
Dent

(10) Patent No.: US 6,314,504 B1
(45) Date of Patent: Nov. 6, 2001

(54) MULTI-MODE MEMORY ADDRESSING USING VARIABLE-LENGTH

(75) Inventor: Paul W. Dent, Pittsboro, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/264,795

(22) Filed: Mar. 9, 1999

(51) Int. Cl.⁷ .................................................. G06F 12/00
(52) U.S. Cl. ........................ 711/212; 711/214; 711/220
(58) Field of Search ................................ 711/212, 214, 711/220; 712/220, 225

(56) References Cited

U.S. PATENT DOCUMENTS

| | | |
|---|---|---|
| 4,679,140 | 7/1987 | Gotou et al. . |
| 4,876,639 | 10/1989 | Mensch, Jr. . |
| 4,893,235 | 1/1990 | Butts, Jr. et al. . |
| 5,666,510 | * 9/1997 | Mitsuishi et al. ................ 711/220 |
| 5,680,567 | * 10/1997 | Dent ................................ 711/220 |
| 5,687,344 | * 11/1997 | Mitsuishi et al. ................ 711/220 |
| 5,809,274 | * 9/1998 | Nishimukai et al. ............. 712/210 |

OTHER PUBLICATIONS

"Register Relocation: Flexible Contents for Multithreading," Carl a Waldsburger and William E. Weihl, IEEE, 1993.*

* cited by examiner

Primary Examiner—Reginald G. Bragdon
Assistant Examiner—Christian P. Chace
(74) Attorney, Agent, or Firm—Brinks Hofer Gilson & Lione

(57) ABSTRACT

A processor architecture and associated method improve efficiency of memory accesses and thereby reduces power consumption. New addressing modes reduce most instructions to one or two bytes in length, including immediate addressing of 32-bit addresses. A full instruction set provides complete arithmetic and logical operations using index registers and accumulator while minimizing external memory access.

14 Claims, 4 Drawing Sheets

Fig. 5

| | AC | x1 | x2 | x3 | Reg-to-Reg | | | |
|---|---|---|---|---|---|---|---|---|
| 504 | LOAD | LOAD | LOAD | LOAD | PUSH A | POP→A | GOTO | SHFTL |
| 506 | ADD | ADD | ADD | ADD | A→X1 | POP→X1 | Jmp + N | SHFTR |
| 508 | COMP | COMP | COMP | COMP | A→X2 | POP→X2 | Jmp - N | ROTL |
| 510 | STORE | STORE | STORE | STORE | A→X3 | POP→X3 | GOVIA | ROTR |
| (pc+1) | XOR | load sp | load pc | load pc | A→SP | POP→SP | CALL | RTLC |
| 512 | AND | add to sp | add to pc | add to pc | A→PC | RETURN | Call + N | RTRC |
| 514 | OR | sub fm sp | sub fm pc | sub fm pc | A→CX | POP→CX | Call - N | BYTRL |
| 516 | SUB | store sp | store pc | store pc | OUTPUT | POPOUT | CallVia | BYTRR |
| 518 | LOAD | LOAD | LOAD | LOAD | X1→A | PC→A | INC A | X1LEN1 |
| | ADD | ADD | ADD | ADD | PUSH X | PC→X1 | INC X1 | X1LEN2 |
| | COMP | COMPI | COMP | COMP | X1→X2 | PC→X2 | INC X2 | X1LEN3 |
| | STORE | STORE | STORE | STORE | X1→X3 | PC→X3 | INC X3 | X1LEN4 |
| (x1) | XOR | load sp | load pc | and to cx | X1→SP | ENABLE | DEC A | DAJNZ |
| | AND | add to sp | add to pc | or to cx | X1→PC | PUSH PC | DEC X1 | DX1JNZ |
| | OR | sub fm sp | sub fm pc | XOR cx | X1→CX | DISABLE | DEC X2 | DX2JNZ |
| | SUB | store sp | store pc | store cx | X1 ⇌ (sp) | PC ⇌ (sp) | DEC X3 | DX3JNZ |
| | LOAD | LOAD | LOAD | LOAD | X2→A | CX→A | JCAR1 | X2LEN1 |
| | ADD | ADD | ADD | ADD | X2→X1 | CX→X1 | JNOC1 | X2LEN2 |
| | COMP | COMP | COMP | COMP | PUSH X2 | CX→X2 | JMPB1 | X2LEN3 |
| | STORE | STORE | STORE | STORE | X2→X3 | CX→X3 | JNOB1 | X2LEN4 |
| (x2) | XOR | load sp | load pc | and to cx | X2→SP | CLRA | JACP1 | X3LEN1 |
| | AND | add to sp | add to pc | or to cx | X2→PC | CMPLA | JACN1 | X3LEN2 |
| | OR | sub fm sp | sub fm pc | XOR cx | X2→CX | PUSH CX | JACZ1 | X3LEN3 |
| | SUB | store sp | store pc | store cx | X2 ⇌ (sp) | CX ⇌ (sp) | JANZ1 | X3LEN4 |
| | LOAD | LOAD | LOAD | LOAD | X3→A | INPUT A | JEQ n | LOAD A |
| | ADD | ADD | ADD | ADD | X3→X1 | ILENG1 | JNEQ n | ADD A |
| | COMP | COMP | COMP | COMP | X3→X2 | ILENG2 | JCT n | COMP A |
| | STORE | STORE | STORE | STORE | PUSH X3 | ILENG3 | JLT n | STORE A |
| (x3) | XOR | load sp | load pc | and to cx | X3→SP | ILENG4 | JPOS n | XOR A |
| | AND | add to sp | add to pc | or to cx | X3→PC | MULT | JNEG n | AND A |
| | OR | sub fm sp | sub fm pc | XOR cx | X3→CX | NEGA | JOVL n | OR A |
| | SUB | store sp | store pc | store cx | X3 ⇌ (sp) | PUSH IN | JUFL n | SUB A |

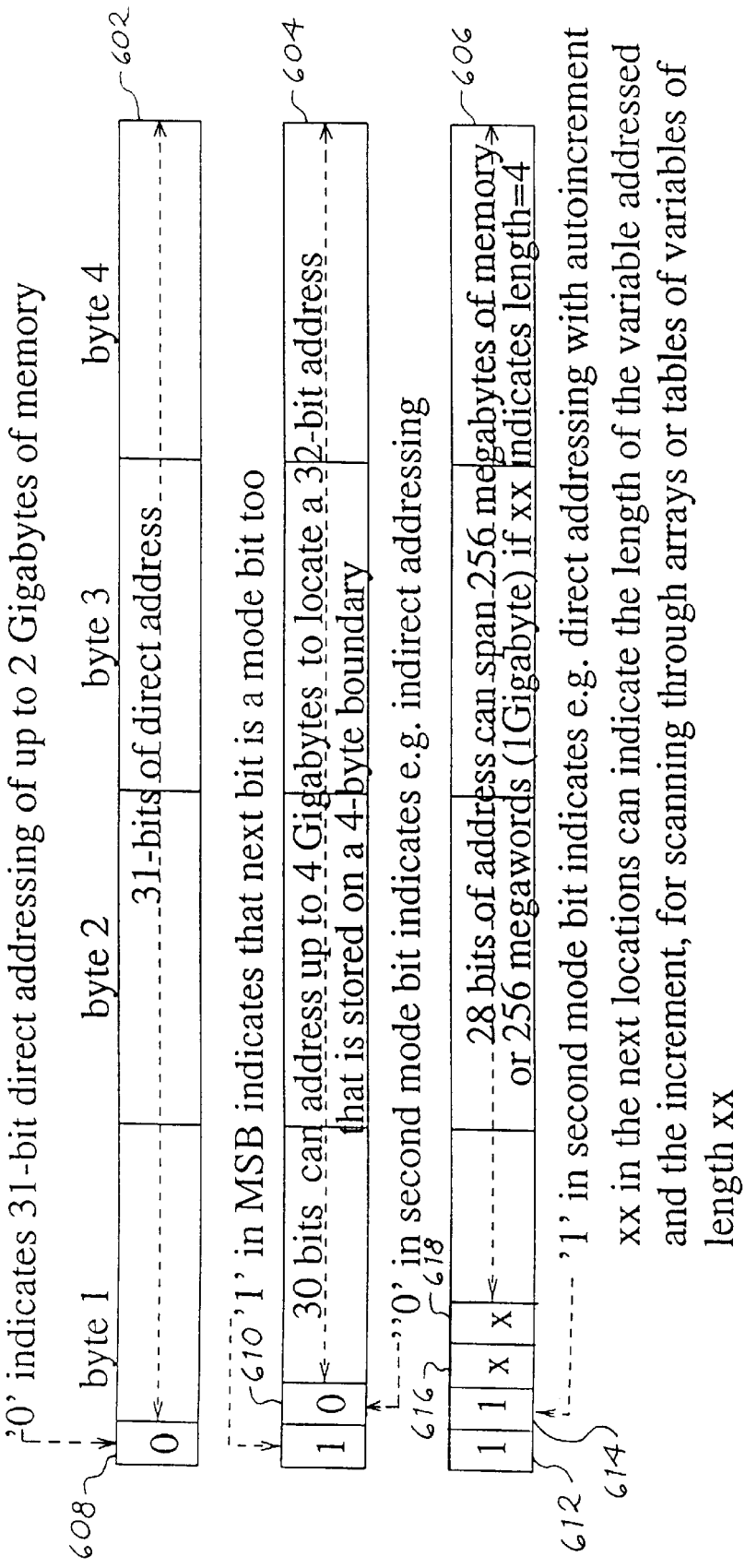

MULTI-MODE MEMORY ADDRESSING USING VARIABLE-LENGTH

BACKGROUND OF THE INVENTION

The invention relates to improved microcomputer architectures, particularly for use in battery powered equipment.

While microprocessors are general-purpose data processing devices, many microprocessor applications are specific in nature. When the application for a microprocessor is not principally the provision of computer facilities, but the inclusion of a microprocessor in the equipment is merely incidental, being for example simply a convenient technical solution to an internal control problem, then the application is termed an "embedded microprocessor" application. Since the provision of computing facilities in embedded applications is not the principal aim, the embedded microprocessor should ideally impact as little as possible on the size, cost and power consumption while satisfying the main objectives of the application.

A typical embedded microprocessor application is a radiotelephone such as a cellular telephone. A cellular telephone is operable in conjunction with a cellular telephone system of remotely located base stations and switches to provide two-way voice and data communications for a user of the cellular telephone. The principal objective of the microprocessor application is to provide two-way voice communication between the cellular subscriber and a remote base station or another telephone subscriber. An incidental need arises for a microcomputer to handle aspects such as receiving and responding to signalling messages from the network that address calls to particular phones or carry other commands during a call. Examples of such commands include turning the mobile phone transmit power up and down or causing the phone to change frequency to handover to different base stations as the telephone moves from one area to another.

An important design goal for radiotelephones such as a cellular telephone is the minimization of current drain by the electrical components of the radiotelephone. Current drain is related to battery life. It is desirable to maximize battery life for user convenience and for other reasons. To maximized battery life, it is desirable to minimize current drain during all operating modes of the radiotelephone.

Modern cellular phones have increasing requirements for software control programs to handle ever more sophisticated network features such as digital voice transmission, data modes, short message services, etc. The volume of software typically included in a phone today is stretching the capabilities of the simplest low-power microprocessors that typically are limited to 64k bytes of memory address space. Unfortunately, processors designed to address much greater memories were conceived for applications other than the battery-power-limited embedded application such as a radiotelephone. Such a processor would severely impact battery life if used in a battery powered application. Power consumption of a microprocessor during execution is also related to the number of memory bits that have to be read or written to perform a given task. Thus in the interests of low power consumption for embedded, battery-powered applications, a high program efficiency is desirable. Consequently, there is a need for a new microcomputer architecture that is convenient to program, has much expanded address space, and yet is efficient on program memory utilization and power consumption for embedded applications.

BRIEF SUMMARY OF THE INVENTION

By way of introduction only, a processor and method in accordance with the present invention provide new addressing modes to reduce the number of bytes of data communicated between the processor and external memory. A full 32-bit memory space is addressable. However, most instructions use only one or two bytes to reduce external memory access and the concomitant power consumption.

BRIEF DESCRIPTION OF SEVERAL VIEWS OF THE DRAWINGS

FIG. 5 shows OPCODE structure for operation codes for a microprocessor; and

FIG. 6 shows formatting for index registers using addressing mode bits.

DETAILED DESCRIPTION OF THE PRESENTLY PREFERRED EMBODIMENTS

Figure 2:
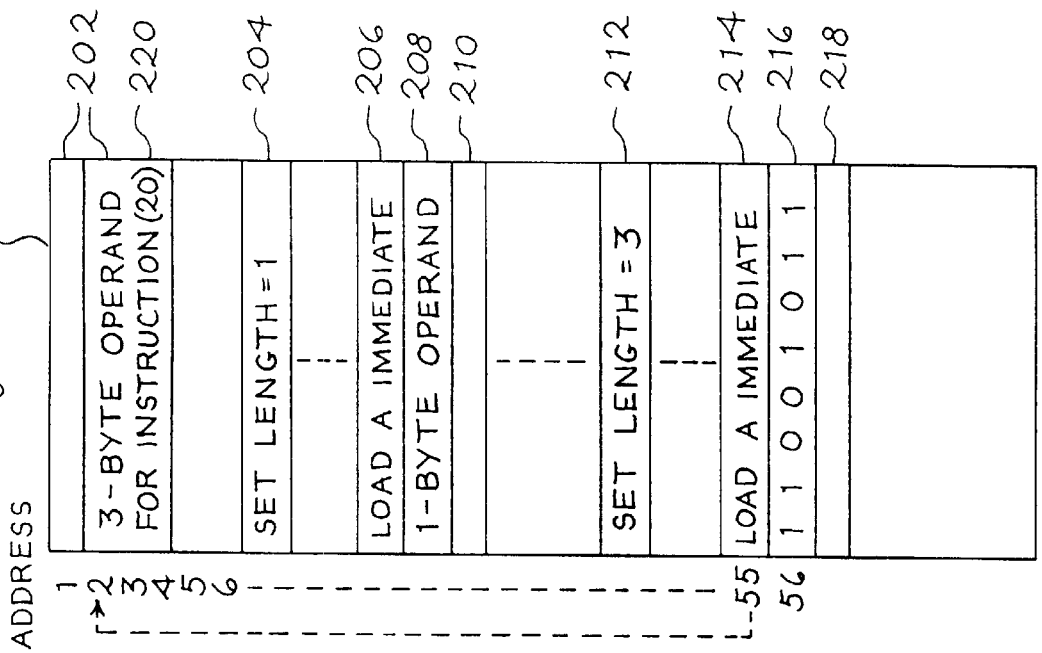
FIG. 2 shows a portion of program memory illustrating variable length register immediate addressing.

The first microprocessors such as the INTEL 4004 were based on only 4-bit words. Rapidly these gave way to a more useable length of 8-bit bytes which became a standard for the majority of microprocessors. The significance of the unit length of words stored in memory is that the essence of computers is that they store their own list of instructions, the program, as well as the data that the program manipulates. With only 4-bit words, one memory location can only define one of 16 instructions to execute, which is a too limited repertoire. To overcome this, 4-bit machines had to use one or more of the 16 available bit patterns to indicate extension of the instruction to a second 4-bit word. Thus there could be a limited repertoire of single-word instructions, but most instructions would end up being of two or more words in length. A machine based on memory widths of 8-bit bytes however has a potential repertoire of 256 possible instructions, which is enough to build a powerful computer. In principal all instructions then have a single-byte operation code (OPCODE). The OPCODE is the machine-readable instruction which identifies the operation to be performed by the microprocessor. An example of a microprocessor having single-byte OPCODES is the RCA 1802.

As memory became cheaper and denser, it soon became possible to accommodate, for example, 65,536 bytes of memory on a single silicon chip. To select each byte requires that a 16-bit address be presented to the memory chip, which will respond by returning the contents of the specified location, or will store a byte presented on 8 data lines in the specified location. Those instructions that address memory, such as LOAD ACCUMULATOR (from a specified location) or STORE ACCUMULATOR (in a specified location) must then have the ability to define the 16-bit address as well as the OPCODE. While 8-bit bytes allow a 256-instruction repertoire, they clearly have no room left to specify memory addresses requiring 16 bits more. Several previous techniques have been employed for appending 16-bit memory addresses to 8-bit OPCODES. The aforementioned RCA 1802 computer included a small number of internal 16-bit registers to hold 16-bit memory addresses. The register to be used for the source of an address could be specified by a much smaller number of bits in the 8-bit OPCODE. This type of addressing is termed REGISTER DIRECT ADDRESSING. If the address had to be changed, the contents of the register would first have to be changed by, for example, loading it with a new address from memory. This meant executing a LOAD REGISTER instruction with its own OPCODE. Thus, in practice the efficiency of single-byte instructions is somewhat illusory if a number of instructions have to be used in sequence to execute the simplest task.

Other means to overcome this problem include the addressing mode known as IMMEDIATE ADDRESSING. Here, the OPCODE corresponding to instructions that need to supply a 16-bit address to memory is followed by a further two bytes containing the 16-bit address. This means that the instruction plus address actually occupies 3 consecutive bytes of memory. If a high percentage of the instructions were of this type, program efficiency, measured in terms of the number of bytes of program required to perform a given task, is reduced by a factor of three. Power consumption of a microprocessor during execution is also related to the number of memory bits that have to be read or written to perform a given task. Thus in the interests of low power consumption for embedded, battery-powered applications, a high program efficiency is desirable.

Many other addressing techniques are also provided in various previous microprocessor and computer architectures in attempting to give the programmer all possible means to create an efficient program. Other known addressing modes are described below.

i) REGISTER+OFFSET or BASE+DISPLACEMENT

This addressing mode derives its efficiency from the presumption that, while all program memory must be accessible, the amount needed to be accessed by each small section or subroutine of a program is often limited. Thus, a 16-bit register can be loaded once with the address of the start of the data storage area used by that subroutine, and the instructions of the subroutine only need specify an 8-bit (1-byte) offset from the start address. The offset is added to the BASE REGISTER before use to obtain the EFFECTIVE ADDRESS. This allows most memory-reference instructions in the subroutine to be of two bytes, while non-memory reference instructions can be single-byte instructions.

Occasionally it will still be necessary to address outside this limited 256-byte memory area. This could for example be provided by reserving a bit in memory-reference OPCODES to indicate whether the following offset was a single byte or two-byte offset, thus providing the possibility for 16-bit as well as 8-bit offsets when needed. Unfortunately, reserving an OPCODE bit for this purpose halves the number of memory-reference OPCODES that can be included in the repertoire. Moreover, if more than one base register can be specified, this also requires the use of bits in the OPCODE instruction field.

Moreover, it is essential that such information, which indicates the total length of an instruction plus its following qualifying bytes, be permanently included in the instruction in a way that cannot be changed either accidentally or deliberately. Misinterpretation of the length of an instruction would cause a failure in the execution of a set of sequential instructions.

ii) PC-RELATIVE ADDRESSING

One type of instruction that has to specify an address is a program sequence change instruction. Examples are a JUMP IF instruction to a different point of the program or a CALL SUBROUTINE instruction. One method of indicating the address to which program execution will be transferred is to include the new address after the OPCODE in the instruction list. Thus a JUMP instruction might consist of a 1-byte OPCODE followed by a two-byte address as implemented for example in the INTEL 8085 or ZILOG Z80 microprocessors.

In case it is not known when writing the program exactly what the 16-bit address will be for the destination of the JUMP or CALL instruction, the programmer uses a symbol such as "STEP1" in his program. Later, the instruction this symbol refers to is labelled with the symbol so that the address it is stored at can be filled in. Such a procedure is called resolving forward references as it is carried out by the assembler or compiler that processes the programmer's program text or source code into the form that will finally be stored in the microprocessor program memory.

This type of memory addressing is referred to as immediate addressing and has the disadvantage that the JUMP or CALL instructions occupy three bytes, an OPCODE plus two address bytes. Analysis of program statistics shows a high percentage of JUMPs are to locations within 128 bytes of the JUMP instruction, and so could be specified as a one-byte offset from the JUMP instruction. This is called program counter (PC) relative addressing, which has the advantage of reducing most JUMP instructions to two bytes. A second advantage of program counter relative addressing is that the executable form of the program is position independent. Unlike absolute addresses, the offset bytes do not change if that section of program is relocated to a different memory address as a result of changes.

iii) AUTOINCREMENTED REGISTER ADDRESSING

To avoid the overhead of specific program instructions to increment the address contained in the register, as is needed using an INTEL 8085 for example, the autoincremented register addressing mode is selected. This mode may be indicated by a specific bit or bits in memory reference OPCODES that indicate whether the register specified to contain the address shall be incremented after use (postincrement) or decremented before use (pre-decrement). Autoincremented register addressing mode gives advantages when, as often happens, an array of data in memory is to be accessed sequentially. Post-increment and pre-decrement are the usual options provided. Double post-increment or pre-decrement are also options to be found in previous microprocessors such as the Motorola 6809 microprocessor. However, indicating these options by the use of bits in the OPCODE rapidly exhausts the bits available in one byte to define the instruction repertoire. This requires recourse to supplementary OPCODE bytes (two-byte instructions) which is the typical instruction length in the 6809. This reduces the program efficiency in terms of bytes to perform a given task.

One other option exemplified in an earlier design avoids the need to waste OPCODE bits specifying whether an increment is single or double. The 2050 minicomputer manufactured and sold by GEC Computers in the 1970's had the ability to specify the length in bytes of entries stored in memory that were being scanned using autoincremented register addressing. A single byte SET LENGTH=1,2,3 OR 4 instruction could be executed to define whether array elements that were being sequentially accessed were of length 1,2,3 or 4 bytes. The autoincrement added to the address register would correspondingly be 1,2,3 or 4. However, once a SET LENGTH instruction was executed, the same length applied whichever register was used for addressing. It was not possible simultaneously to scan an array of 3-byte elements and an array of 2-byte elements without repeating the SET LENGTH instruction to change the length from 3 to 2 between accessing the first array and the second array.

iv) INDIRECT ADDRESSING

In indirect addressing mode, an address specified by any of the previous modes is interpreted not as the address of the desired data location, but of a location where the desired data address will be found. This provides the possibility for the actual data address, stored at that location in memory, to be longer than 16 bits for addressing a larger memory than 64 Kbytes. For example, PC-relative addressing can be used to refer to a memory location within ±128 bytes of the instruction OPCODE, where a 24-bit address for the actual data will be found. If indirect addressing is available, as indicated by the INDIRECT BIT of the OPCODE being set, then the 24-bit value will be used not as the data but as the address to data on which the instruction will operate. This allows 16 Megabytes of memory to be addressed by only a one-byte OPCODE plus a one-byte offset. The disadvantage of needing an indirect bit set in the OPCODE is the halving of the instruction repertoire without recourse to supplementary bytes. This is the trade off selected in the Motorola 6809 architecture.

v) REGISTER+REGISTER OFFSET ADDRESSING

In register+register offset addressing, one register serves as a base register and a second register serves as an offset which is added to the base register to obtain the effective address. For example, the addressing modes of the aforementioned Motorola 6809 processor allow specifying addition of the A or B accumulators (8-bits) to the 16-bit S, U, X or Y registers to form the effective address. The INTEL 80x86 series of processors increases the address space still further by computing the address as 16 times the base register (SEGMENT register) plus the offset register.

vi) COMBINATIONS OF THE ABOVE ADDRESSING MODES.

In principle, register+offset, indirect and autoincrement addressing modes could all be combined, although the utility of auto-incrementing a register used for indirect addressing is limited. It would be more useful if the address contained in memory and pointed to by the register were autoincremented, rather than autoincrementing the register itself. No computer that does this is known. The aforementioned Motorola 6809 processor does allow virtually any addressing mode to be additionally designated as INDIRECT, for example the REGISTER+ACCUMULATOR effective address can be specified to be used in directly or indirectly addressed mode. A computer of 1960's vintage, the XEROX DATA SYSTEMS SDS920 had yet another addressing feature, based on its having a memory word length (24 bits) that exceeded the memory addressing capability that could conceivably be provided economically with technology available at that time. This allowed one bit to be dedicated in the address field itself to indicate whether the address should be used directly or indirectly. Moreover, if the supplementary address found by using the first address indirectly had its indirect bit set, this would trigger the use of that address indirectly and so on, in a recursive fashion until the final, direct address value was found.

None of the above examples disclose efficiently addressing a large memory space while preserving an efficient instruction repertoire having many one-byte instructions and memory-reference instructions having often one or no modifying offset byte. Accordingly, there is a need for such a system in the art.

According to the present embodiment, index registers are employed in calculating an effective address for a memory-reference instruction. Each index register comprises a mode byte indicating how the register value shall be used. Thus the bits to indicate whether autoincrement/decrement, direct versus indirect addressing or base+one/two-byte offset addressing modes may be located in the mode byte associated with the register and do not encumber the OPCODE.

Figure 1:
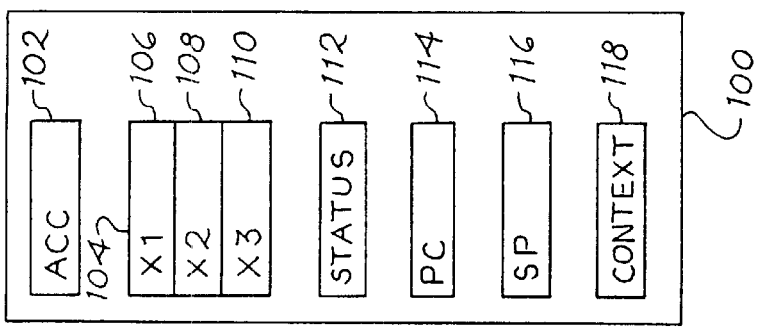
FIG. 1 shows a register stack of a microprocessor.

FIG. 1 illustrates a register stack 100 for a microprocessor in accordance with the present embodiment. The register stack 100 includes an accumulator 102, three index registers 104 including a first index register 106 labelled X1, a second index register 108 labelled X2 and a third index register 110 labelled X3. The register stack 100 further includes a STATUS register 112, a program counter register (PC) 114, a stack pointer 116 and a machine context register 118.

The accumulator is a variable length register used for performing logical and arithmetic operations on binary data. The length of the accumulator in the illustrated embodiment is established during program execution by use of an instruction referred to herein as a SETLENGTH instruction. A SETLENGTH instruction controls how the microprocessor treats data and memory addresses during processing. A SETLENGTH instruction may establish the accumulator length at any usable length. In the illustrated embodiment, accumulator length is limited to byte (eight bit) increments from one byte to four bytes with a default value of four bytes (32 bits). Other accumulator lengths may be established as required.

The index registers X1, X2 and X3 are used for reading, manipulating and storing data in memory. The index registers may be any suitable length or may have variable lengths as set by the SETLENGTH instruction. In the illustrated embodiment, the index registers all have a fixed length of 32 bits.

The STATUS register 112, also referred to as a CONDITIONS register, includes bits, which indicate the status of the other registers and of current conditions of the processor. The contents of the STATUS register 112 are modified during operation of the microprocessor.

In addition to the accumulator, index registers and STATUS or CONDITIONS register, the preferred implementation comprises a 32-bit PROGRAM COUNTER register 114. The PC 114 indicates the location of the current instruction in memory. After executing the current instruction, unless it was a BRANCH instruction such as a JUMP or CALL which was taken, the PC 114 increments by the length in bytes of the just-executed instruction so as to point to the next instruction.

The stack pointer 116 points to an area of Random Access Memory used to hold temporary variables for each machine context. The machine context register 118 indicates which set of registers is the current set of registers to be used, thus determining which MACHINE CONTEXT is the currently executing program. Changing the machine context register 118 immediately causes a CONTEXT SWITCH, which is an efficient means to divide computer power between multiple concurrent tasks. Context switching is usually triggered by an interrupt indicating that an external device needs service or has completed a task.

In the illustrated embodiment, each of the registers forming the register stack 100 is nominally 32 bits wide. Thus, in a preferred implementation there are provided, for each MACHINE CONTEXT, eight 32-bit registers including an accumulator and three INDEX REGISTERS denoted by X1, X2 and X3.

The most significant byte of each register contains mode bits which indicate how the register shall be used in forming the address to memory. FIG. 6 illustrates three examples of formatting of index registers in the register stack. FIG. 6 shows a first index register 602, a second index register 104 and a third index register.

In one example, the most significant bit (MSB) 608 of first index register 602, when equal to the value 0, indicates that the remaining 31 bits of the register 602 may be interpreted as an address to up to 2 Gigabytes of memory. If the bit is equal to 1 on the other hand, it indicates that the remaining 31 bits are to be interpreted in a different fashion. In other examples, more bits than just the MSB 608 are used for this purpose.

Another example is illustrated by index register 604 of FIG. 6. In index register 604, the second most significant bit 610 indicates whether direct addressing using the remaining 30 bits of 1 Gigabytes of memory was intended. Alternatively, according to the value of the bit 610, indirect addressing was intended. In that case, the remaining 30 bits would seek a full 32-bit address somewhere within a 1 Gigabyte area. If, however, 32-bit addresses are constrained to lie on a 4-bit boundary, the remaining 30 bits may be used as a word address, spanning 4 Gigabytes.

Yet another alternative is to use two bits of each index register to indicate which one of four ways should be employed to interpret the remaining 30 bits, for example:

i) direct addressing
ii) direct addressing with autopostincrement by the length of the operand.

This is illustrated in FIG. 6 by index register 606. In that example, the 1 in the most significant bit 612 indicates that the next bit, second most significant bit 614, is a mode bit, too. The 1 in the second most significant mode bit 614 indicates that direct addressing with autoincrement is intended. The next locations, bit 616 and bit 618, indicate the length of the variable addressed and the increment.

iii) direct addressing with autopredecrement by the length of the operand
iv) indirect addressing If two bits are used for mode indication, direct addressing is then limited to 30 bits, corresponding to 1 Gigabyte, which may nevertheless be considered very adequate.

In the above, the length of the operand addressed will depend on the instruction. For example, if the instruction is reading from memory or modifying a 32-bit register or writing a 32-bit register to memory, the operand length is four bytes. However, many applications do not need 32-bit variables but can use one-byte or even one-bit quantities to improve memory utilization efficiency. It is therefore desirable to be able to vary the length of at least one register, such as the accumulator. This may be done, for example, using a SET LENGTH instruction, to efficiently manipulate shorter word lengths.

The set length value is stored in another of the eight registers per MACHINE CONTEXT that were envisaged for a preferred implementation. This register, the CONDITIONS or STATUS register, is used also to store other information related to machine status such as whether various INTERRUPTS are inhibited or allowed, or whether a previous arithmetic operation had caused a carry, overflow, borrow, underflow or ZERO result. In previous designs, once a SET LENGTH instruction had been used to set the length of the accumulator, that length was the same for all index registers or addressing modes.

As part of the present embodiment, a SET LENGTH instruction defines the operand length, not for the accumulator, but for each addressing mode that can be used with accumulator instructions. In particular, a SET LENGTH instruction can be used to set the accumulator length that shall apply when the X1 index register is specified for addressing the memory. A separate SET LENGTH instruction can be used to specify the accumulator/operand length that shall apply when the X2 register or the X3 register is specified for addressing.

Yet another SET LENGTH instruction can be used to specify the accumulator length that shall apply for IMMEDIATE addressing when the operand bytes are stored following the instruction OPCODE. In this case however, yet another feature may be included to avoid a potential failure in execution of sequential instructions. Preferably, the number of operand bytes following an instruction in an immediate addressing mode will not depend on variables outside the instruction itself, such as the SET LENGTH variable. Should those variables be changed inadvertently, causing an operand byte to be erroneously executed as an OPCODE, further errors will result. To avoid this disadvantage, it could be arranged that four operand bytes always follow an accumulator instruction using immediate addressing, whatever the accumulator set length value. However, this would be wasteful of program memory when the majority of variables need less than 32 bits.

A more efficient alternative sets to one the number of bytes following the OPCODE of an instruction using immediate addressing in connection with a variable length. Any number could be used, such as two bytes, but in the interests of maximum program memory economy the preferred implementation uses immediate operands of one byte in length. Moreover, this byte shall be interpreted as the required operand only when the set length value for the register is one byte. When the set length is other than one, this byte shall be interpreted as the offset from the instruction address to a location in program memory where an operand of the right length is stored. Such operands may be stored in locations outside the sequence of program flow through the correct use of program entry and exit addresses or the use of JUMP instructions to bypass such storage locations. This removes the danger that a SET LENGTH error could cause the above-mentioned failures.

FIG. 2 illustrates the operation of immediate addressing for the two alternative cases of SETLENGTH=1 and SETLENGTH=3, respectively. FIG. 2 illustrates a portion of program memory 200. The program memory 200 comprises a plurality of uniquely addressable memory storage locations 202. In FIG. 2, the memory address is shown next to each storage location 202. In the illustrated embodiment, each storage location 202 is eight bits wide. This value is suitable for reducing memory cost and maximizing memory efficiency. Other suitable storage location widths may be used as well.

The program memory 200 stores instructions and fixed constants such as variable addresses which are placed there by a program compiler or another source. In the illustrated example, instructions are stored at location 204, location 206, location 210, location 212 and location 214. Constants are stored at location 208, location 216 and location 220. The term constant here is used in reference to an operand as distinguished for the OPCODE for an instruction.

At some point a program branch causes the exemplary program illustrated in FIG. 2 to be entered and the instruction at location 204 to be executed. The instruction at location 204 is SETLENGTH=1, which sets the length of the accumulator for immediate addressing modes to be one byte.

At some point thereafter the instruction at location 206 is executed. This instruction loads a one-byte value using immediate addressing. The one-byte constant is located in the location 208 immediately following the location 206 of the instruction. The operand is loaded into the accumulator. It is known to the machine a priori that the Load A immediate instruction will always be followed by a single byte constant, the operand in location 208. Therefore, the total instruction length is always 2 bytes and the machine therefore knows that the next instruction to be executed is the instruction at location 210 and not the constant at location 208.

At another point in the program, a 24-bit value is to be manipulated. Thus the SETLENGTH instruction at location 212 sets the length of the accumulator to be 3 bytes for manipulating the 24-bit value. Then the instruction at location 214 is executed to load the accumulator with the 24-bit value, using immediate addressing. On this occasion, because the set length value is 3 bytes, the machine knows that the single byte that always follows an IMMEDIATE instruction cannot be the 3-byte operand. Therefore, the IMMEDIATE constant at location 216 is instead interpreted as an OFFSET byte for PC-relative addressing.

The program counter for the instruction at location 214 contains the address 55. The constant at location 216 has the exemplary value −53. Thus the PC-relative address is computed to be 55−53=2, indicating that the 3-byte operand value starting at location 220 is to be fetched starting at address 2 in program memory. The execution of this instruction sequence thus fetches bytes from locations 2,3,4 into the accumulator.

It would have required one byte less in total program storage if the actual 3-byte operand could have been stored after the instruction at location 214 instead of a one-byte offset at location 216 plus the 3-byte operand at location 220. Acceptance of this minor inefficiency is necessary to avoid the problem alluded to earlier if IMMEDIATE constant lengths were permitted to be dependent upon variables external to the instruction code itself.

The principle used above may be used in other applications. For example, the instruction "STORE IMMEDIATE" is normally meaningless when the instruction and the immediately following bytes are stored in Read Only Memory (ROM). It is then impossible to write the value to be stored to that memory.

Figure 3:
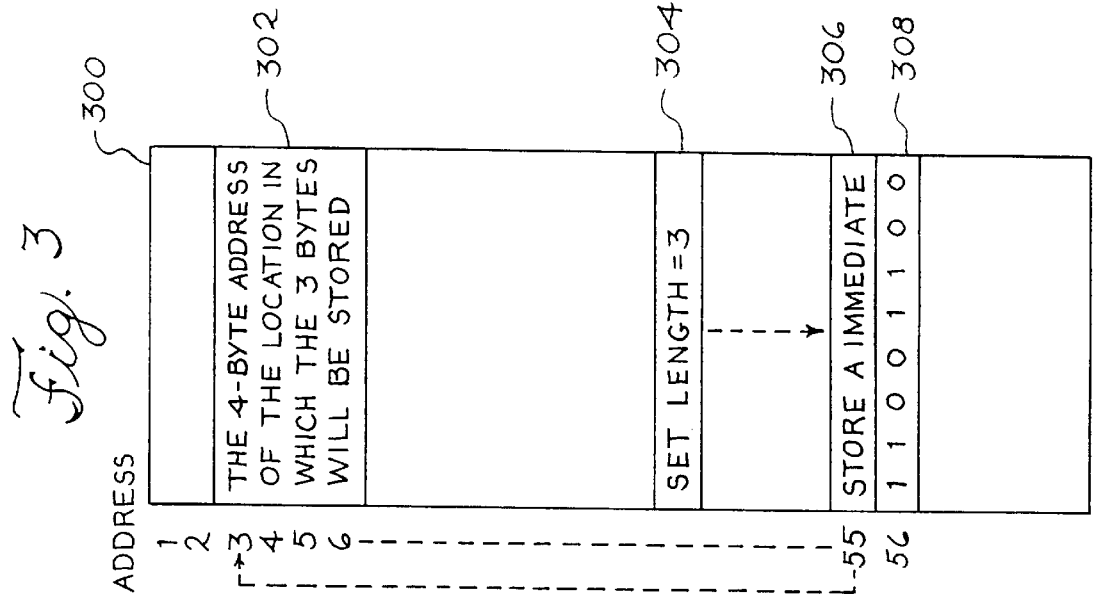
FIG. 3 shows a portion of program memory illustrating interpretation of a store immediate instruction.

FIG. 3 shows a portion of program memory 300 and illustrates a way to ascribe useful meaning to a STORE IMMEDIATE instruction, which may be termed "IMMEDIATE-INDIRECT" addressing. For the STORE instruction, it is clear that the IMMEDIATE operand (which immediately follows the OPCODE in program memory) cannot be the location for receiving the value to be stored. Therefore in the illustrated implementation of FIG. 3, the IMMEDIATE operand is interpreted as the address of a location (in read-write memory, also referred to as random access memory or RAM) where the value shall be stored. Since an address would always have the fixed length of 4 bytes, one solution would be for the IMMEDIATE constant following a STORE instruction always to have the length 4 bytes. However, if more than one such STORE instruction is to be contained in a single program, it may be more efficient to store the 4-byte address only once, and to access it using PC-relative addressing using one-byte offset (33). In FIG. 3, the four-byte address is stored at location 302. A one-byte offset is stored in location 308 immediately after the STORE IMMEDIATE instruction in location 306.

In FIG. 3, program execution encounters the instruction in location 304. That instruction is a SET LENGTH instruction which specifies the value in the accumulator to be three bytes in length. Subsequently, the processor encounters the STORE IMMEDIATE instruction in location 306. This instruction directs the processor to store three bytes using immediate addressing. This instruction is interpreted such that the immediately following byte, in location 308, is the offset from the current instruction address. In the illustrated example, location 306 has an address 55 and location 306 at address 56 stores an offset of −52. The program counter then proceeds to address 55−52=3 in storage location 302. That storage location is the address in program memory where a four-byte address for storing the three-byte accumulator value will be found.

Figure 4:
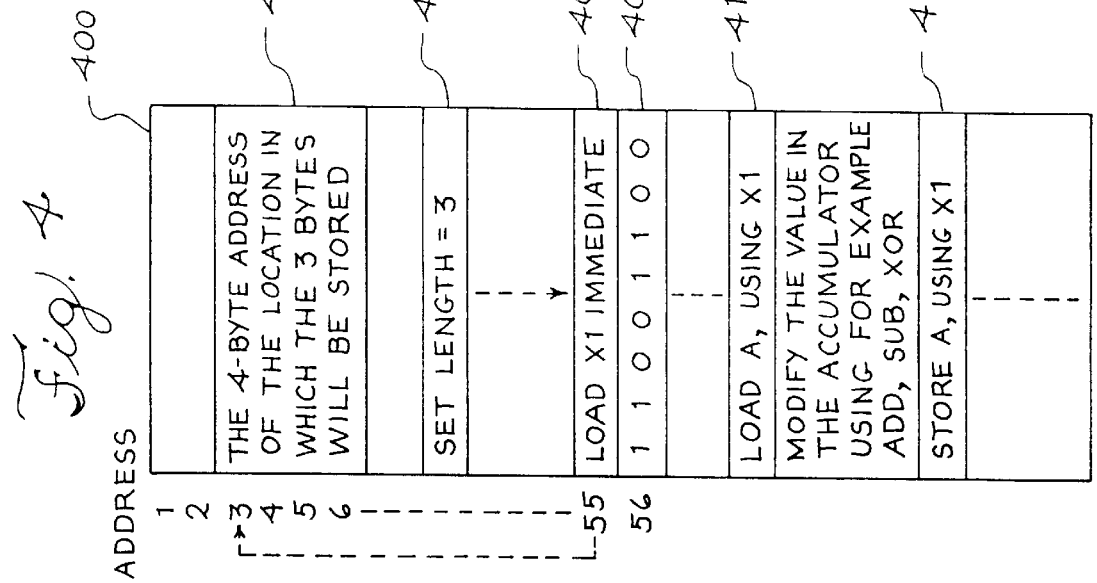
FIG. 4 shows a portion of program memory illustrating memory access involving a 24-bit quantity.

In FIG. 2, it is illustrated how a LOAD IMMEDIATE instruction can obtain a constant of any length from program memory, which may be ROM, as appropriate for storing constants. In FIG. 3, it is illustrated how a STORE IMMEDIATE instruction may be caused to write a value of any length to read-write memory (RAM). FIG. 4 illustrates how a value of any length such as 3 bytes or 24 bits may first be read from a location in RAM, modified, and the modified value written back to RAM.

FIG. 4 illustrates a portion of program memory 400. The program stored in program memory 400 is entered somewhere after storage location 402, having address 6, where non-code values are stored, and prior to the instruction at storage location 404. The instruction at location 404 is a SETLENGTH instruction which sets the accumulator length to 3 bytes. The instruction at location 406 is subsequently executed. This instruction loads the 4-byte index register X1 using immediate addressing. Because the register X1 always has a length of 4 bytes in the exemplary implementation, the machine knows a priori that the single byte constant immediately following the LOAD X1 IMMEDIATE instruction cannot be the value to be loaded into X1. Instead, the constant at location 408 having the value −52 is treated as a PC-relative offset to the location 402 where the 4-byte address is actually stored. Thus X1 is loaded with the four bytes from addresses (3,4,5,6) at storage location 402.

The instruction at location 410 is a LOAD A, USING X1 instruction. This instruction loads the accumulator with 3 bytes that are located somewhere in RAM at the address now held in X1. A single-byte Load A instruction specifying that index register X1 shall be used for addressing is thus executed.

The three-byte value is then read from memory into the accumulator and modified by subsequent instructions. The instruction at location 412 stores the modified value back into RAM. This instruction executes a STORE A instruction specifying the same index register X1.

In contrast with previous designs, the illustrated embodiment allows several new variations to be performed. If it is desired that the modified value should not overwrite the original value, but be stored in an adjacent location in RAM, the 4-byte address at location 402 which is loaded into index register X1 can have its MODE bits set to indicate auto-postincrement. Then, after performing the LOAD A instruction at location 406, the value of X1 is incremented by the operand length (established by the SETLENGTH=3 instruction at location 404) prior to executing the STORE A instruction 412. The modified value is written to the next three-byte location in RAM following the original unmodified variable. Note that, if the operand length depends on which addressing mode is specified (immediate, via X1, via X2 or via X3), then the SET LENGTH=3 instruction at location 404 is a different SET LENGTH=3 instruction from that of FIG. 1. In FIG. 2, the length is set to 3 for immediate addressing while in FIG. 3 the length is set to 3 for addressing using X1.

Another issue solved by the present embodiment is the implementation of BASE+DISPLACEMENT addressing using immediate constants as the displacement or offset, when it is desired to allow the latter to be of different lengths in bytes as determined by external variables. This also carries the danger of inadvertent changes in those external variables causing catastrophic malfunction.

To solve this problem, it is first necessary for base+displacement addressing to be indicated in the instruction OPCODE, so that the machine will know whether to expect a following offset constant or not. Also, the instruction must identify the BASE register to use, such as X1, X2 or X3. In some embodiments, base+displacement addressing can be limited to a subset of the registers, such as X3, which is always assumed to be using base+displacement addressing. This indication is not then required when addressing using X1 or X2. Although the immediate constant following the instruction must always be of a fixed length, it can be interpreted as a PC-relative offset to a location containing a displacement constant of any length, the length being indicated by the mode bits of the base register. Since the displacement constant is located outside of executable code, a misinterpretation of its length carries no danger of the feared type of catastrophic mis-execution of the program sequence.

Base+displacement addressing is useful in constructing programs efficiently to manipulate data structures comprising variables of various lengths, when several such structures of the same geometry but stored in different locations are to be manipulated. The program may store fixed constants in ROM that indicate the displacement of variables of the same type from their respective base addresses. To operate on different structures, the base index register then only need be set equal to the base address of the structure to be manipulated.

FIG. 5 shows an exemplary allocation of instructions to 256 byte values. The byte values are arranged in an 8×32 table, but no specific bit allocations for the OPCODES are implied. Actual bit allocations would be made, for example, during chip design to simplify the program instruction interpreting logic. Nevertheless, an eight bit OPCODE can address and specify any of the 256 instructions illustrated in FIG. 5. Any suitable bit allocation for the illustrated byte values may be used.

The first column 502 of instructions, labelled AC in FIG. 5, contains operations involving the accumulator. This column includes an instruction 504 to LOAD the accumulator from memory, an instruction 506 to ADD the accumulator value to a value from memory, an instruction 508 to compare the value in the accumulator with a value in memory, an instruction 510 to STORE the accumulator to memory and instructions 512, 514, 516, 518 to XOR, AND, OR and SUBtract a value from memory to/from the accumulator. The COMPare instruction 508 subtracts a value in memory from the accumulator but does not modify the accumulator value.

Going down the columns, the four different groups of the same eight instructions specify different addressing techniques. The first group 520 of eight instructions specifies the IMMEDIATE modes of addressing discussed at length above in conjunction with FIGS. 2–4. The three other groups 522, 524, 526 relate to the use of the X1, X2 or X3 registers for addressing, respectively. Instructions of the first group 520 will thus always be followed by an IMMEDIATE byte, while the other three groups are single-byte instructions. Nevertheless, all instructions may address variables in a very large memory space such as 1 Gigabyte.

The group 530 of eight instructions at the bottom right of FIG. 5 has been added for completeness to illustrate the base+displacement addressing discussed above. In the illustrated embodiment, base+displacement addressing is only available with register X3 as the base register. Mode bits in X3 determine the length of the displacement in bytes, while the displacement would be stored in program memory using PC-relative addressing with a one-byte offset following the instruction. These eight instructions are also therefore two-byte instructions.

Likewise, the second column 540, third column 542 and fourth column 544 contain instructions that involve other registers. In the illustrated embodiment, though, the operands of these instructions are always of length four bytes. This is different from the accumulator instruction of column 502, which are programmable to lengths of one, two three or four bytes. Because there are more registers to be manipulated, the instructions are restricted from eight to four. The instructions are selected to be the four most useful register manipulation instructions, given that registers are generally used for addressing rather than performing ALU functions. The most useful functions to perform with registers are LOAD, ADD COMPare and STORE.

Each of the index register instructions in column 540, column 542 and column 544 includes a COMP instruction in which the value register is apparently compared with itself. Such an instruction normally would always yield the result "EQUAL." To give useful meaning to comparing a register with itself, those positions in the OPCODE table are used to store the instruction COMPare Immediate. The COMPare Immediate instruction allows X1, X2 or X3 to be compared to an IMMEDIATE 4-byte constant.

The remaining instructions for each of the groups 520, 522, 524 and 526 in the X1 and X2 index register columns 540, 542 have been filled with instructions involving the stack pointer (SP) and the program counter (PC). Similarly, remaining instructions for each of the groups 520, 522, 524 and 526 in the X3 index register column 544 have been filled with instructions involving the STATUS or CONDITIONS register, referred to as CX. In the case of the stack pointer (SP) and the program counter (PC), the most useful four instructions are LOAD, ADD, SUBtract from and STORE. In the case of the stack pointer, these instructions allow reservation and release of temporary variable storage. In the case of the program counter, these instructions implement relative jumps. In the case of the STATUS or CONDITIONS register CX, the most useful instructions are bit manipulation instructions AND (for clearing a particular bit or bits), OR (for setting a particular bit or bits) and XOR (for inverting a particular bit or bits). CX may be loaded by loading the accumulator or any of the index registers X1, X2 or X3 and then doing an A→CX or X1→CX, X2→CX or X3→CX register-to-register transfer using the appropriate instruction from the fifth column 550.

The register-to-register transfer instructions of the fifth column 550 and the sixth column 552 may be readily appreciated by those ordinarily skilled in the art. However, instructions in positions corresponding to transferring a register to itself are redefined to have more useful meaning. Such instructions instead cause the register value to be pushed on to the stack at a RAM location indicated by the stack pointer, SP, after which SP is incremented by 4. Moreover, the eighth instruction in each of groups 520, 522, 524, 526 of eight is redefined to be a useful function. In the illustrated example, these instructions are defined as exchanging the register value with the value stored at the top of the stack, as pointed to by the stack pointer (SP).

The seventh column 554 contains primarily jumps and calls. The unconditional LONG JUMP "GO TO" allows branching to anywhere in memory as specified by a four-byte IMMEDIATE address. The unconditional Jmp +N or Jmp −N allows branching anywhere within +/−65536 bytes as specified by a two-byte immediate constant. The conditional jumps, which are the last 16 instructions in column 7, perform branching anywhere within +128 to −128 bytes of the current location as determined by a one-byte IMMEDIATE offset.

In the eighth column 556, accumulator and register length instructions are defined. For completeness in illustrating the above discussions regarding setting the accumulator length, separate instructions are included for setting the accumulator length to be assumed when using IMMEDIATE addressing (ILENG1, ILENG2, ILENG3 and ILENG4) as opposed to using index register addressing when using X1 (X1LEN1, X1LEN2, . . . X1LEN4) or X2 (X2LEN1, X2LEN2, . . . ) or X3 (X3LEN1, . . . ). This is not however the only method of specifying the accumulator length to be assumed for index register addressing. Instead, more bits of the register could be used for specifying the mode, as opposed to spanning a huge address space, including specifying the accumulator length to be assumed when using the register in question for accumulator-memory instructions.

The instruction set contains other usual instructions such as accumulator right and left shifts (SHFTR, SHFTL), which now shall apply to the length of the accumulator set by an ILENG(n) instruction, and also rotations (ROTL, ROTR) or rotations including the carry bit (RTLC, RTRC). Other instructions include CLRA, CMPLA, NEGA and MULT to respectively clear, complement, negate or multiply the accumulator. In the latter case, the most significant 16 bits of the accumulator are multiplied with the least significant 16 bits yielding a 32-bit result in the accumulator. Input/output instructions are also provided as INPUT A, which inputs a value presented on external pins to the accumulator. The number of pins required, from eight pins to thirty-two pins, is set by the variable length of the accumulator. The OUTPUT instruction outputs bits from the accumulator to external pins. POPOUT outputs a value from the top of stack to external pins and decrements the stack pointer and PUSHIN places a value from external pins on the top of stack and increments the stack pointer. These instructions allow efficient sequential execution of multiple-byte or word input/output events.

Also, one-byte increment and decrement instructions such as INC A, INC X1 are provided. These instructions allow incrementing or decrementing of the accumulator by one, or incrementing and decrementing the index registers by the specified operand length.

In alternative embodiments, the instruction set of FIG. 5 may be further enriched by arranging that the per-machine-context registers are memory-mapped, for example to the beginning of RAM. This allows all data-memory-reference instructions such as ADD A IMMEDIATE to reference registers too, for example by specifying an IMMEDIATE address that maps to the X1 register of a particular context. In this way, other useful instructions are obtained, such as "ADD two bytes of X1 to the 2-byte Accumulator", which is not explicitly shown as a separate instruction, or LOAD a value into one byte of the CX register. The latter instruction can be implemented by a STORE A IMMEDIATE instruction, using a length 1 and an immediate address that maps to the desired byte of CX.

From the foregoing, it can be seen that the present embodiment provides a method and apparatus for a computer for addressing a large memory and having a rich instruction set. The instruction set is particularly rich in addressing modes, yet uses a majority of single-byte instructions. This ensures efficient program memory utilization and thereby low power consumption for the computer and a system employing the computer.

While a particular embodiment of the present invention has been shown and described, modifications may be made. For example, the present invention has been described in the context of a general-purpose microprocessor. However, the inventive principles may be suitably applied to a microcontroller or digital signal processor while realizing similar enhancements in efficiency. It is therefore intended in the appended claims to cover all such changes and modifications which follow in the true spirit and scope of the invention.

What is claimed is:

1. A method for addressing memory locations in a computer, the method comprising the steps of:
   (a) determining a current length of a variable length register;
   (b) reading an operation code stored at a location in memory, the operation code indicating that an immediate addressing mode is to be used;
   (c) reading a constant value from a memory location following the location of the operation code;
   (d) combining the constant value with a value in the variable length register when the current length of the variable length register is equal to length of the constant; and
   (e) using the constant value to locate a value having a length that matches the current length of the variable length register when the length of the constant is not equal to the current length of the variable length register.

2. The method of claim 1 wherein step (a) comprises the steps of:
   (a1) reading mode bits stored in the variable length register; and
   (a2) determining the current length from the mode bits.

3. The method of claim 2 further comprising the step of:
   (a3) determining a current addressing mode from the mode bits.

4. A method for addressing memory locations in a computer, the method comprising the steps of:
   determining a register length for a variable length register;
   reading an operation code from a location in memory;
   determining an immediate addressing mode for memory access from the operation code;
   reading a next byte from a next location in memory;
   if the register length matches a predetermined value, interpreting the next byte as an operand;
   if the register length does not match the predetermined value, interpreting the next byte as an offset from a current instruction location to a location in memory where an operand is stored; and
   subsequently, operating on the operand.

5. The method of claim 4 wherein the predetermined value is one byte.

6. A processor comprising:
   a variable-length accumulator; and
   one or more index registers for storing memory addresses in association with a variable length indicator, wherein the length of the accumulator is settable to a first length when a first index when a first index register is used for addressing and the length of the accumulator is settable to a second length when a second index register is used for addressing.

7. A processor comprising:

a variable-length accumulator; and one or more index registers for storing memory addresses in association with a variable length indicator, wherein the accumulator and each index register store one or more mode bits defining the length of the accumulator to be assumed during execution of an instruction referencing one of the one or more index registers or the accumulator.

8. In a computer, a method of providing a greater variety of program instructions for a given instruction length, the method comprising the steps of:

providing at least one index register configured to store a number of bits for specifying a memory location to be addressed by one of the program instructions; and assigning a first group of bits of the at least one index register to indicate an addressing mode for the one of the program instructions, the addressing mode indicating how remaining bits stored in the at least one index register shall be used to specify the memory location to be addressed by the one of the program instructions, the addressing mode being selected from at least two addressing modes of a list including:

direct addressing;

indirect addressing without autoincrement or autodecrement;

indirect addressing with autoincrement;

indirect addressing with autodecrement;

base-plus-displacement addressing using an offset of a first length; and base-plus-displacement addressing with an offset of a second length.

9. A processor comprising at least one index register having a plurality of bit storage locations including a first plurality of bit positions configured to store bits to specify a memory location to be addressed by an instruction; and a second plurality of bit positions configured to store bits to specify an addressing mode for said instruction that specifies an index register for addressing.

10. The processor of claim 9 wherein the addressing mode is selected from at least two addressing modes of a list including: direct addressing; indirect addressing without autoincrement or autodecrement; indirect addressing with autoincrement; indirect addressing with autodecrement; base-plus-displacement addressing using an offset of a first length; and base-plus-displacement addressing with an offset using an offset of a second length.

11. The processor of claim 9 wherein each index register of the at least one index register has an associated variable length indicator which may be set independently of variable length indicators associated with other index registers of the at least one index register.

12. In a computer, a method comprising the steps of:

(a) storing in program memory an operation code for an instruction, the operation code having an indication that an IMMEDIATE addressing mode is to be used and an indication of a register to be used by the instruction;

(b) storing a constant having a predetermined invariable length sequentially following the operation code in program memory; and (c) using the constant to access a memory location, including (c1) in a first case, using the constant as an offset to a location in program memory containing a value to be combined with said register value, and alternatively (c2) in a second case, using the constant to determine a location in program memory to which a value is to be written.

13. The method of claim 12 wherein the predetermined invariable length comprises one byte.

14. The method of claim 12 wherein step (c2) comprises reading from one or more locations in program memory an address specifying said location in memory to which said value shall be written.

* * * * *

UNITED STATES PATENT AND TRADEMARK OFFICE
CERTIFICATE OF CORRECTION

PATENT NO. : 6,314,504 B1
DATED : November 6, 2001
INVENTOR(S) : Paul W. Dent

It is certified that error appears in the above-identified patent and that said Letters Patent is hereby corrected as shown below:

<u>Column 14,</u>
Line 67, delete the second occurrence of "when a first index."

Signed and Sealed this

Twelfth Day of March, 2002

Attest:

Attesting Officer

JAMES E. ROGAN
*Director of the United States Patent and Trademark Office*